United States Patent
Kleffman et al.

[11] 3,742,193
[45] June 26, 1973

[54] DEVICE FOR SELECTING THE CALCULATING MECHANISM AND CONTROLLING THE MODE OF OPERATION OF A CASH REGISTER OR PRINTING ACCOUNTING MACHINE

[75] Inventors: Gunter Kleffman, Bielefeld; Gerhard Rethmeier, Oldentrup, both of Germany

[73] Assignee: Anker-Werke AG, Bielefeld, Germany

[22] Filed: Apr. 26, 1972

[21] Appl. No.: 247,556

[30] Foreign Application Priority Data
Apr. 26, 1971 Germany............ P 21 20 461.5

[52] U.S. Cl.............................................. 235/62 F
[51] Int. Cl.............................................. G06c 23/00
[58] Field of Search............ 235/62 F, 60 R, 60 TH, 235/60 M

[56] References Cited
UNITED STATES PATENTS
3,286,919  11/1966  Metschnabel et al. .......... 235/60 M
3,370,788  2/1968  Gassino ........................... 235/62 F
3,478,959  11/1969  Rethmeier ....................... 235/62 F
3,688,979  9/1972  Kleffmann ....................... 235/62 F

Primary Examiner—Stephen J. Tomsky
Attorney—Herbert L. Lerner et al.

[57] ABSTRACT

Device for selecting calculating mechanisms and controlling modes of operation of a cash register or printing accounting machine having manual or automatic selecting and controlling means associated one with the other for selecting the calculating mechanisms and the respective mode of operation of the machine and including a row of control keys, rows of calculator selecting keys and differential release mechanisms associated with the rows of keys, including control discs which, in automatically operative condition of the machine, for determining cross totals of the calculating mechanisms, are pre-adjustable stepwise by the machine drive into a new control position for a next succeeding machine operation, stop means for the control discs, and sensing means for determining in the next succeeding machine operation a setting for one of the rows of control keys and for the differential release mechanisms associated with the rows of calculator selecting keys, upon which setting the selecting of the calculating mechanisms and the controlling of the modes of operation are dependent.

12 Claims, 11 Drawing Figures

DEVICE FOR SELECTING THE CALCULATING MECHANISM AND CONTROLLING THE MODE OF OPERATION OF A CASH REGISTER OR PRINTING ACCOUNTING MACHINE

The invention of the instant application relates to a device for selecting the calculating mechanism and controlling the mode of operation of a cash register or printing accounting machine and, more particularly, to such a device having manual and automatic control and selecting means coordinated therewith for selecting the calculating mechanism and the respective mode of operation of the machine to be controlled.

Mechanical bookkeeping or accounting machines having print-out mechanism with paper carriages that are fitted with interchangeable program control rails which control a pre-selectable program in the course of performing accounting or book-keeping operations, have been known heretofore as, for example, in German Pat. 1,194,182.

Moreover, it is no longer novel to determine by suitable programming automatically the cross total of all the calculating mechanisms on program-controlled invoicing machines, also provided with print-out mechanisms and paper carriages, wherein the calculating mechanisms are set to zero one after the other and the totals obtained are transferred by addition to an adding mechanism (note U.S. Pat. Nos. 2,756,926 and 3,072,329).

For cash registers and accounting machines provided with print-out mechanisms and operating without paper carriages and program rails, a stepwise adjustable selecting and mode of operation controlling device has already been proposed by means of which the computing mechanisms are returned to zero to obtain the cross total in a rising and falling sequence.

Whereas the aforementioned types of machines provided with print-out mechanisms permit given possible variations in the sequence of selection of the calculating mechanisms and operational modes of the machine, in the case of the last-mentioned cash registers and printing accounting machines, only inflexible operating systems have hitherto been known which exclude any kind of variation.

Cash registers and, above all, printing accounting machines, are furnished, however, with a considerable number of calculating mechanisms which are usually divided into groups and sub-groups in order, for example, to handle certain classes of goods or services.

It is accordingly an object of the invention of the instant application to provide an automatic device for selecting the calculating mechanism and controlling the mode of operation of cash registers and accounting machines equipped with printing mechanisms, which affords a variable initial control of the calculating mechanism and the modes of operation of the respective cash registers and accounting machines.

With the foregoing and other objects in view, there is provided, in accordance with the invention, a device for selecting calculating mechanisms and controlling modes of operation of a cash register or printing accounting machine having manual and automatic control and selecting means associated one with the other for selecting the calculating mechanisms and the respective modes of operation of the machine to be controlled, comprising, when the operation of the machine is automatic, control discs pre-adjustable stepwise by the machine drive into a new control position for a next succeeding machine operation for determining cross totals of the calculating mechanisms. The discs are provided with stop means for determining through scanners or sensing means operatively associated therewith, a setting for one of the rows of control keys and for the differential release mechanisms associated with the rows of calculator selecting keys, in the next succeeding machine operation. The selecting of the calculating mechanisms and the controlling of the modes of operation are dependent upon the setting.

Through the automatic calculator selecting and mode of operation control device according to the invention, calculations by cash registers and printing accounting machines are made exceptionally flexible, because the stepped stops of the pre-adjustable control discs are adaptable to particular requirements and both the sequence of movements as well as the selection of the calculating mechanisms may be varied as desired, due to the varying construction of the control discs. The selecting and mode of operating control device of the invention affords, for cash registers and printing accounting machines, completely new functions or operations which were hitherto reserved only for accounting machines furnished with print-out mechanisms and program controls.

In accordance with another feature of the invention, the control discs are mounted on a switch shaft, and there is further included a stepping switch actuable by the machine drive for effecting stepwise rotation of the control shaft and operable either by a manual or automatic control means and, before the completion of an initiated machine operation, the control discs are transferable into a control position determining the functions of the next succeeding machine operation.

In accordance with a further feature of the invention, the differential release mechanisms associated with the row of control keys and the differential release mechanisms associated with the rows of calculator selecting keys, respectively, have a multiplicity of positions "0" to "11" and "0" to "9," respectively, that are to be controlled, the positions being selectable, by the control discs, in any alternate combination for controlling different operations of the machine.

In accordance with yet another feature of the invention, a balance amount mechanism exerts a controlling influence upon automatic totaling operations of the machine for determining cross totals of the calculating mechanisms, the balance amount mechanism controlling, in accordance with the algebraic condition thereof, positive and negative intermediate and final totaling operations of the machine.

In accordance with an added feature of the invention, there are provided means for interrupting automatic operation of the machine to determine the cross total of all of the calculating mechanisms, and means for manually triggering a further amount inserting machine operation to resume operation of the machine.

Other features which are considered as characteristic for the invention are set forth in the appended claims.

Although the invention is illustrated and described herein as embodied in device for selecting the calculating mechanism and controlling the mode of operation of a cash register or printing accounting machine, it is nevertheless not intended to be limited to the details shown since various modifications and structural changes may be made therein without departing from the spirit of the invention and within the scope and range of the equivalents of the claims.

The construction and method of operation of the invention, however, together with additional objects and advantages thereof will be best understood from the following description of specific embodiments when read in connection with the accompanying drawings, in which:

Figure 1:
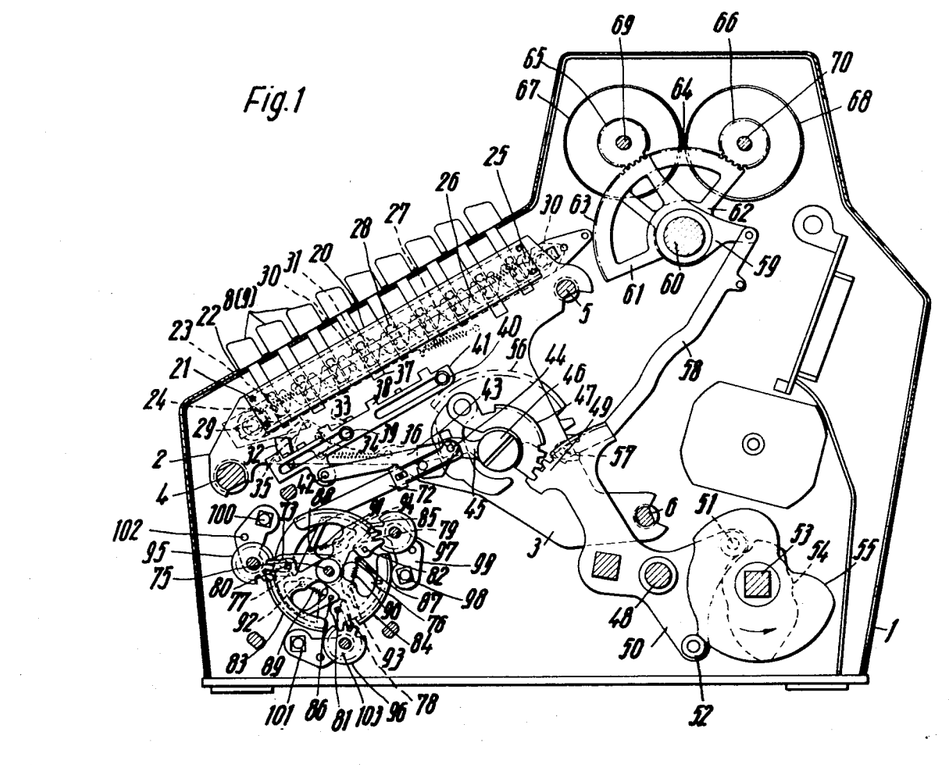
FIG. 1 is a cross-sectional view of a cash register incorporating the device of the invention, taken through a bank of amount keys.

Referring now to the drawings, and first particularly to FIG. 1 thereof, there is shown therein a cash register 1, including a key bank 2 formed of triangular support plates 3 slid onto fixed shafts 4, 5 and 6 and locked by suitable securing means. As seen more clearly in FIG. 2, the key bank 2 has five rows 7 of amount keys 8 and 9, four rows 10 of value keys 11, one row 12 of control keys including a control key 13 for releasing interim addition operations of the machine, a control key 14 for releasing final addition operations of the machine and a key lock 15 formed of a plurality of code keys 16, for controlling different machine functions, and two rows 17 of calculating mechanism selector keys 18 and 19.

Figure 2:
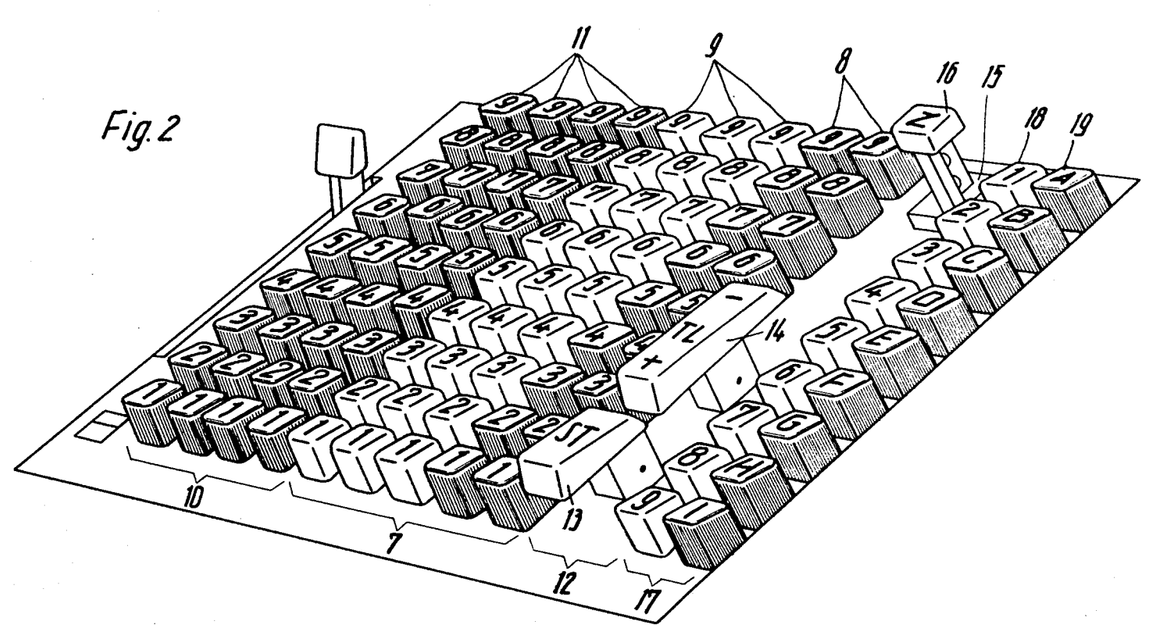
FIG. 2 is an enlarged perspective view of the keyboard of the cash register of FIG. 1.

A U-shaped guide rail 20 is secured to the support plate 3 by screws 21, the shanks 22 of the amount keys 8 of a row 7 thereof, as shown in FIG. 2, being displaceably journalled in the rail 20. Riveted to the key shanks 2 are key pins 23 which are biased by a tension spring 27 suspended from pins 24 and 25 and supported by bearing pins 26 into holding the amount keys 8 in the initial position thereof shown in FIG. 1. The key pins 23 extend into slots 28 formed in the bearing plate 3, which is provided with bearing bolts 29 and 30, a locking slide 30' and a zero pawl slide 31 being displaceably disposed on the bolts 29 and 30. A projection or nosepiece 32 of the zero pawl slide 31 cooperates with a switch pin 33 of a zero stop pawl 35 which is rotatable about the bolt 34 and is subjected to the biasing action of a tension spring 36. Mounted on the key shafts 22 are offset stops 37 cooperating with teeth 38, also offset, of a control mechanism stepping slide 41 guided on stay bolts 39 and 40, a draw bar 43 being suspended from a bearing bolt 42 of the stepping slide 41, the draw bar 43 being, in turn, secured to a pin 44 of a control mechanism release lever 45. The release lever 45 is part of a conventional differential release mechanism 46, having a drive segment 47 in engagement with a toothed segment 49 rotatable on a spindle 48 fixed to the cash register housing. Sensing or scanning rollers 51 and 52 are rotatably mounted on a lever arm 50 of the toothed segment 49, and cooperate with cam discs 54 and 55, which are secured to a main shaft 53 of the cash register, the cam discs 54 and 55 being so profiled that, during part of the first half of the rotation of the main shaft 53, they transport the toothed segment 49 in clockwise direction, as viewed in FIG. 1, and during part of the second half of the rotation of the main shaft 53, they transport the toothed segment 49 into the starting position thereof, shown in FIG. 1. In the course of this operation, the stepping slide 41 is moved to the right-hand side, as seen in FIG. 1, until a tooth 38 abuts a stop 37 of a depressed key 8. The pawl and ratchet control mechanism 46 also has a toothed segment 56 which adjusts or set the type wheels of a conventional printing mechanism through non-illustrated gears and connecting shafts, and is articulatingly linked by a pin 57 with a rod 58 which is, in turn, linked to a lever 59. The lever 59 is rotatably mounted on a fixed shaft 60 and drives toothed segments 61 and 62, the teeth of which mesh with pinions 65 and 66, which are secured to indicator rollers 67 and 68, and are journalled on spindles 69 and 70.

Another draw bar 72 is articulatingly linked to the pin 44 of the release lever 45 and is set in driving engagement by a pin 73 with a triple-armed disc 76 rotatable on a spindle 75. The disc 76 is provided with rectangular entrainer members or drivers 77 and 79 which cooperate with square stay bolts 80, 81 and 82 of the toothed segments 83, 84 and 85 which are also rotatably mounted on the spindle 75. Suspended from the pins 86, 86 and 88 of the disc 76 are tension springs 89, 90 and 91 which are secured to pins 92, 93 and 94 of the toothed segments 83, 84 and 85 and maintain the stay bolts 80, 81 and 82 in positive force-locking engagement with the drivers 77, 78 and 79. The toothed segments 83, 84 and 85 mesh in their engaged condition with counting wheels 95, 96 and 97 of the calculating mechanisms. The calculators include a balance amount mechanism 99 of conventional construction disposed on a control shaft 98, and nine adding mechanisms 102, 103, designed, respectively, on switch shafts 100 and 101. The adding mechanisms 102, 103 have nine counting wheels 95, 96 per decimal place, so that, in addition to the balance amount mechanism 99, a total of 18 adding mechanisms are provided. When the amount is introduced, the slide 41 of the control mechanism scans or senses, during the first half of the operation of the machine, the amount keys 8, 9 and is arrested by the depressed amount key. Since this process takes place in the "addition" mode, the selected calculator or calculators are swung during the second half of the operation of the machine into the toothed segment 83, 84 and 85 and transfer the previously scanned or sensed values to their position.

Figure 3:
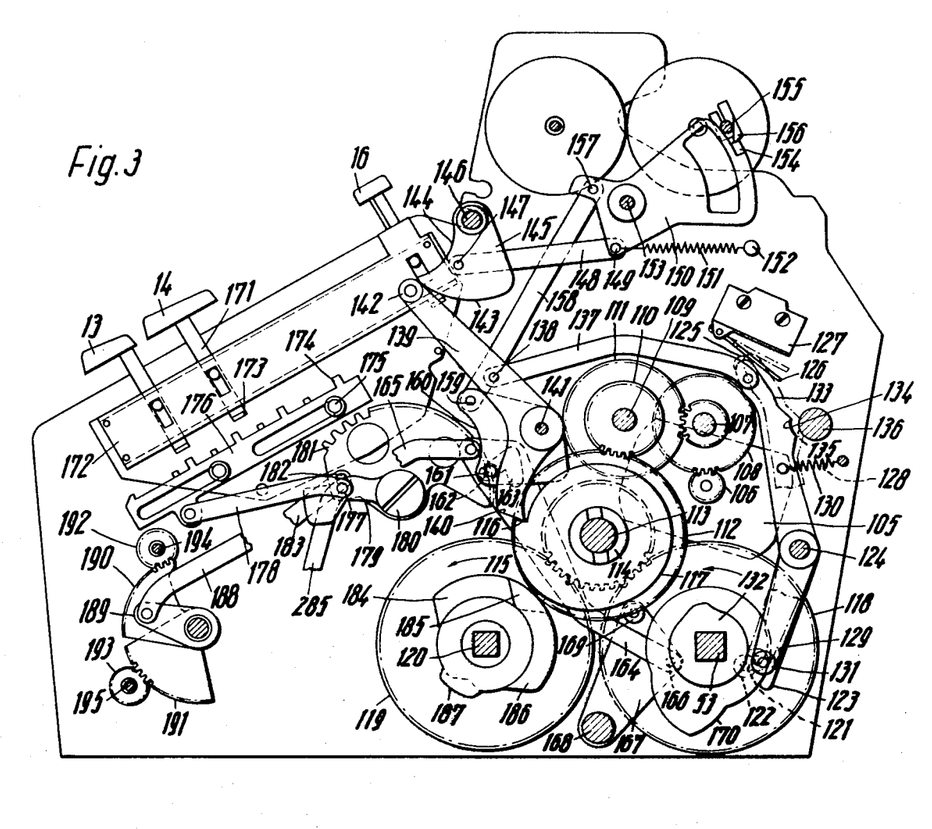
FIG. 3 is a cross-sectional view of the cash register of FIG. 1 taken through a bank of control keys.

The driving mechanism of the cash register 1 shown in FIG. 3 includes an electric motor 105 provided with a pinion 106 which meshes with a gear 108 that is rotatable on a stationary bearing pin 107 and drives, through another reduction stage 110, 111 mounted on a bearing pin 109, a gear 112 which is journalled on a pin 113 and is connected by a conventional roller clutch 114 to a gear 115 and a locking disc 117 provided with a stop 116. The gear 115 simultaneously meshes with a gear 118 secured to the aforementioned main shaft 53 of the machine as well as with a gear 119 secured to another control shaft 120 of rectangular cross section. A switch roller 122 is rotatably mounted on a pin 121 at the back of the gear 119 and cooperates with a switch lever 123 rotatable journalled on a bolt 124 and having a lever arm 125 which acts on a switch lever 126 of a switch 127, serving to close the circuit of the electric motor 105. In the stage shown in FIG. 3, the switch lever 123, which is subjected to the action of a tension spring 128 and the switch roller 122, is disposed in ineffective position (switched-off position). The bolt 124 also carries another switch lever 129 which is subject to the influence of a tension spring 130, and is provided with a scanning or sensing roller 131 which cooperates with a control cam 132 mounted on the main shaft 53 of the machine. The lever arm 133 of the switch lever 129 and the lever arm 125 of the switch lever 123 are provided with arcuate stops 134 and 135, which cooperate with a stationary bolt 136 which limits the rotation of the switch levers 123 and 129 that is produced by the tension springs 128 and 130, when the switch 127 is switched on. Secured to the lever arm 123 is a rotatable link 137 which engages a pin 138 of a locking lever 139 provided with a locking hook 140 which cooperates with the aforementioned stop 116 of the locking disc 117. The locking lever 139 is secured on a switch shaft 141 and carries a slide roller 142 which, in starting position thereof, abuts a concave control profile 143 of a release segment 145 provided with another concave control profile 144. The release segment 145 is secured to a release shaft 146 and carries a pin 147 on which a link 148 is rotatably mounted and is operatively connected by a pin 149 with a switch segment 150. A tension spring 151 is connected at one end thereof to the pin 149 of the switch segment 150 and is suspended at the other end thereof from a stationary pin 152. The switch segment 150 is rotatably journalled on a pin 153 and has a stop 154 which is in contact in the starting position with a locking member 156 that is secured to a switch shaft 155 which forms part of a locking device described in German Pat. 964,905 and serves for releasing the operation of the machine when one of the control or calculator selecting keys shown in FIG. 2 is actuated.

Linked to the pin 157 of the control segment 150 is a rod 158 which is rotatably mounted on a pin 159 of a switch member 160 which is also secured to the switch shaft 141 and has a switch pin 161 provided with a switch lever 162 which engages in a V-shaped groove 163 formed in a link 164 which is maintained in the starting position corresponding to the position shown in FIG. 3 by a spring-loaded rod 165. The link 164 is rotatably secured to a pin 166 of a triangular scanning or sensing segment 167 which is journalled on a stationary bolt 168 and has a guide roller 169 which cooperates with a switch cam 170 that is rigidly secured to the main shaft 53 of the machine.

When an operation of the machine is started, the switch shaft 155 turns the locking member 156 counterclockwise, as viewed in FIG. 3, and the switch segment 150 also turns under the bias of the tension spring 151 in the same rotary direction about the pin 153. Accordingly, the link 148 entrains the release segment 145 which releases the locking lever 139 of which the locking hook 140 is swung under the bias of the tension spring 130, which engages the switch lever 129, out of the vicinity of the stop 116, and the lever arm 133 of the switch lever 129 switches on the switch 124. The starting electric motor 105 accordingly rotates the main shaft 53 of the machine as well as the control shaft 120 in counterclockwise direction, as viewed in FIG. 3, the switch lever 123 being also transferred to the switched-on position under the bias of the tension spring 128. As soon as the control cam 132, after a partial rotation of approximately 260°, turns the switch lever 129 counterclockwise, as viewed in FIG. 3, the locking lever 139 and the switch shaft 141 connected thereto are swivelled in the same rotary direction and, in turn, transfer the switch segment 150, as well as the release segment 145 to the starting position shown in FIG. 3. Just before the end of the operation of the machine, the switch roller 122 actuates the switch lever 123 which switches off the electric motor 105, and the stop 116 strikes against the locking hook 140.

The shafts 171 of the control key 13, the control key 14 and the code key 16 located in the control key bank 12, also have stops 173 cooperating with rectangular stops 174 of a release slide 176 guided rectilinearly by pins 175. The slide 176 is in driving engagement through a draw bar 178 secured to a pin 177, with a setting or adjusting lever 179 of a differential control or release mechanism 180 which is also driven by the main shaft 53 of the machine. Riveted to the toothed segment 181 of the differential control mechanism 180 is a pin 182 which serves to receive a draw bar 183 which is provided for adjusting a non-illustrated control disc which determines the selection of the calculating mechanism and the mode of operation of the machine.

A cam disc 184 for final totaling operations of the machine, a cam disc 185 for intermediate totals, a cam disc 186 for addition operations, as well as a cam disc 187, all of which effect the swinging-in movements of the calculating mechanism, are secured on the control shaft 120.

The device for controlling the modes of operation of the machine and for selecting the calculating mechanism is thoroughly described in German Published Application DDS 1,963,636.

The selector keys 18 and 19 of the calculating mechanism are also displaceably mounted in non-illustrated key banks and cooperate with non-illustrated differential release mechanisms which drive, through the link 188 (FIG. 3) and lever drives 189, toothed segments 190 and 191, which are in engagement with pinions 192 and 193. The pinions 192 and 193 are mounted on switch shafts 194 and 195 which, through conventional steep-pitched lifting drives, effect the lateral displacement of the switch shafts 100 and 101 (FIG. 1) for the purpose of selecting the individual adding mechanisms 102 and 103 in dependence on the setting or adjustment of the differential control mechanism coordinated therewith. The hereinbefore-described devices are known and thoroughly described in German Published Application DDS 1,963,636.

Figure 4:
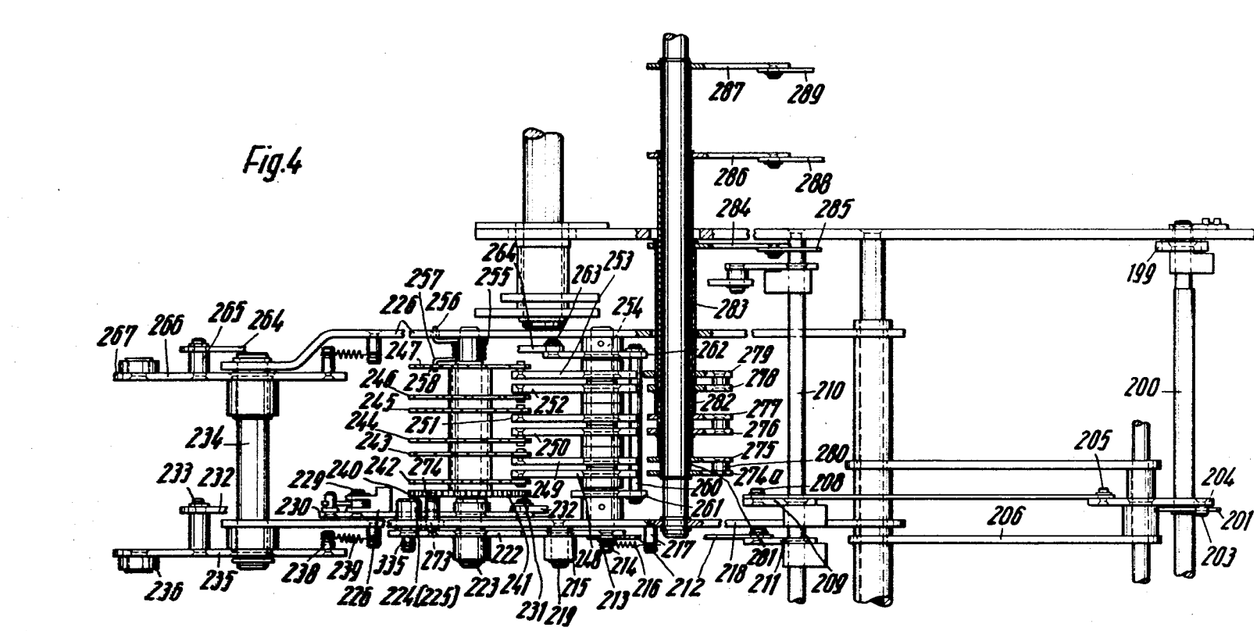
FIG. 4 is a plan view, partly in section, of an automatic control and selecting device according to the invention.

The differential control or release mechanism 180 (FIG. 3) adjusts, through a partially illustrated gear connection 199, a control disc 201 (FIG. 4) secured to a switch shaft 200, the profile 202 of the control disc 201 (FIG. 5) cooperating with a scanning or sensing pin 203 of a bell-crank lever 204, which is also provided with a pin 205 to which a draw bar 206 is linked.

Formed in the profile 202 is a substantially rectangular recess 207 into which the scanning or sensing pin 203 can drop when the differential release mechanism 180 attains the position determined by the code key 16/z (FIG. 2) of the code key 16. The draw bar 206 is rotatably disposed on a bearing pin 208 of a reversing lever 209 located on a switch shaft 210 which carries another reversing lever 211 to which a link 212 is secured. The link 212 is formed with an elongated slot 213 in which a pin 214 of a bell-crank lever 215 engages. Suspended from the pin 214 is a tension spring 216 which is anchored to a pin 217 extending from the machine wall 218. The bell-crank lever 215 is mounted on a pin 219 riveted into the machine wall 218 and is provided with a claw 220 which cooperates with a stop 221 of a switch lever 222 which is freely rotatably mounted on a switch shaft 223 that is adjustably disposed in bores formed in the machine walls 218 and 226. Riveted to the switch lever 222 are pins 224 and 225, of which the pin 224 acts on a feed pawl 226, and the pin 225 on a spring-mounted locking pawl 228 that is journalled on a pin 227 extending from the machine wall 218. The feed pawl 226 is rotatably journalled on a pin 229 seated on a feed disc 230 which is also loosely disposed on the control shaft 223. A rod 232 engages the pin 231 of the conveyor disc 230 and further engages a bolt 233 on a bell-crank lever 235 which is rotatable about a shaft 234 and carries a scanning or sensing roller 236 which cooperates with a cam disc 237 that is secured to the main shaft 53 of the machine. Suspended from a pin 238 of the bell-crank lever 235 is a tension spring 239 which maintains the scanning or sensing roller 236 in contact with the cam disc 237. The feed pawl 229 cooperates with the teeth 240 of a ratchet wheel 241 which is rigidly secured to the switch shaft 223 on which also selector discs 242 and 247 are mounted and cooperate with scanning or sensing levers 248 to 253 that are loosely journalled on a spindle 254. A torsion spring 255 is provided on the switch shaft 223, one arm 256 of the torsion spring 255 being supported on the wall 226 of the machine and the other arm 257 of which engages in a recess 258 formed in the selector disc 247. The scanning or sensing levers 248 to 253 are provided with nosepieces or projections 259 (FIG. 5) under which a lifting spindle 260 is in engagement and is clamped between two lifting levers 261 and 262, which are loosely journalled on the spindle 254. Riveted to the lever 262 is a pin 263 engaged by a draw bar 264 which is rotatably disposed on a bearing pin 265 of a scanning or sensing lever 266 that is subjected to the bias of a spring, and is provided with a sensing roller 267 which cooperates with a control cam 268 mounted on the main shaft 53 of the machine. The hereinbefore-mentioned scanning or sensing levers 248 to 253 have pointed stops 269 and are provided with pins 270 (FIG. 5) engaged by tension springs 271 which are suspended from a stationary spindle 272. Riveted to the switch lever 222 is a rectangular stop 273 which cooperates with a stop pin 274' secured to the ratchet wheel 241. Due to the prestressing of the torsion spring 255, the stop pin 277 is in abutting engagement with the stop 273 in the starting position.

The scanning levers 248 to 253 cooperate by means of the pointed stops 269 thereof with stepped stops 274a and 275 to 279, that are provided in pairs, respectively connected by spacer bolts 280 and rigidly secured to telescoping tubular shafts 284 which is engaged by a draw bar 285 that is linked to the pin 177 (FIG. 3) of the differential release mechanism 180 of the control key row 12. The tubular shafts 282 and 281 also carry levers 286 and 287, respectively, from which draw bars 288 and 289 are suspended and are similarly connected to the non-illustrated differential release mechanisms of the two rows 17 of calculator selector keys. Secured to the feed disc 230 (FIG. 5) is a pin 290 which carries a clip plate or strap 291 that is linked to a pin 292 of a switch lever 294 which is journalled on a fixed pin 293 and also connects with a rod 295. The rod 295 is suspended from a pin 296 of a locking lever 297 which is rotatably mounted on the wall of the machine by a bearing 298. The locking lever 297 is provided with a locking hook 299 which, in starting position, is located in front of a locking pin 300 of a switch lever 301 (note also FIG. 6) which has a lever arm 302 on which a pin 303 of an angularly shaped spring-loaded scanning or sensing lever 304 is disposed, the sensing lever 304 being rotatably journalled on a spindle 305 and supported by a scanning or sensing roller 306 thereof on a cam disc 307 which is secured to the main shaft 53. The switch lever 301 (FIG. 6) turns about an axis 308, and a pin 309 extending therefrom engages in an elongated slot 310 formed in a hood-shaped switch rod 311, which carries a pin 312 to which a tension spring 313 is anchored which engages the pin 309. The switch rod 311 is linked to a switch lever 314 which is seated on the spindle 315, a clip plate or strap 317 being suspended from a pin 316 extending from the switch lever 314, the strap 317 serving to adjust a release segment 318 of the aforementioned locking device, the function of which is adequately known. Secured to the switch lever 301 is a triple-armed lever 319 to which three switch rods 320 are secured adjacent to one another and slidable in pin and slot connections 321, 322 of the key banks 2 associated therewith, one of the control key rows 13 and the two calculator selecting key rows 17 or the key banks thereof being coordinated, respectively, with the switch rods 320. The switch rods 320 are each provided with an angularly bent control profile 323 which cooperates, respectively, with a pin 324 of the zero stop pawls 326 associated with the appropriate key banks 2, the associated zero stop pawl 326 being withdrawn by a movement of the switch rod 320 to the right-hand side of FIG. 6. Riveted to the scanning lever 253 is a pin 327 to which a draw bar 328 is rotatably secured. The draw bar 328 is articulatingly connected by a pin 329 to a triangular locking lever 330 which is provided with a locking pin 331 that cooperates with a locking pawl 332, the adjustment of which is determined by the balance amount mechanism 99 (FIG. 1). When the balance amount mechanism 99 is in a positive condition, the locking pawl 332 is swung by a shaft 333, which is actuated by the balance amount mechanism 99, out of the range of the locking pin 331, whereas, when the balance amount mechanism 99 is in a negative condition, the locking pawl 332 assumes the locked position shown in FIG. 5.

Figure 5:
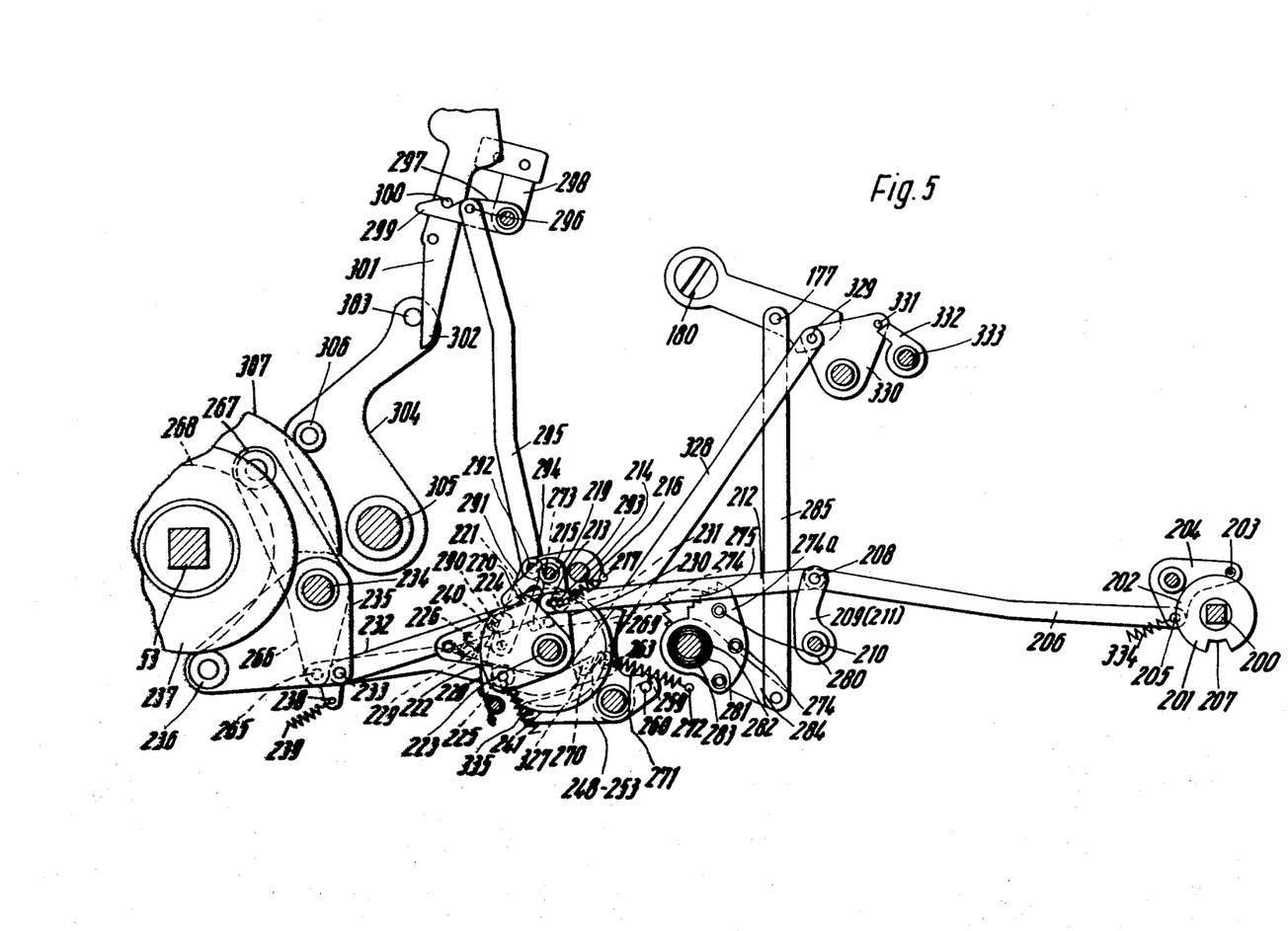
FIG. 5 is a side elevational view of the automatic control and selecting device of FIG. 4 coordinated with various elements of the cash register.
Figure 6:
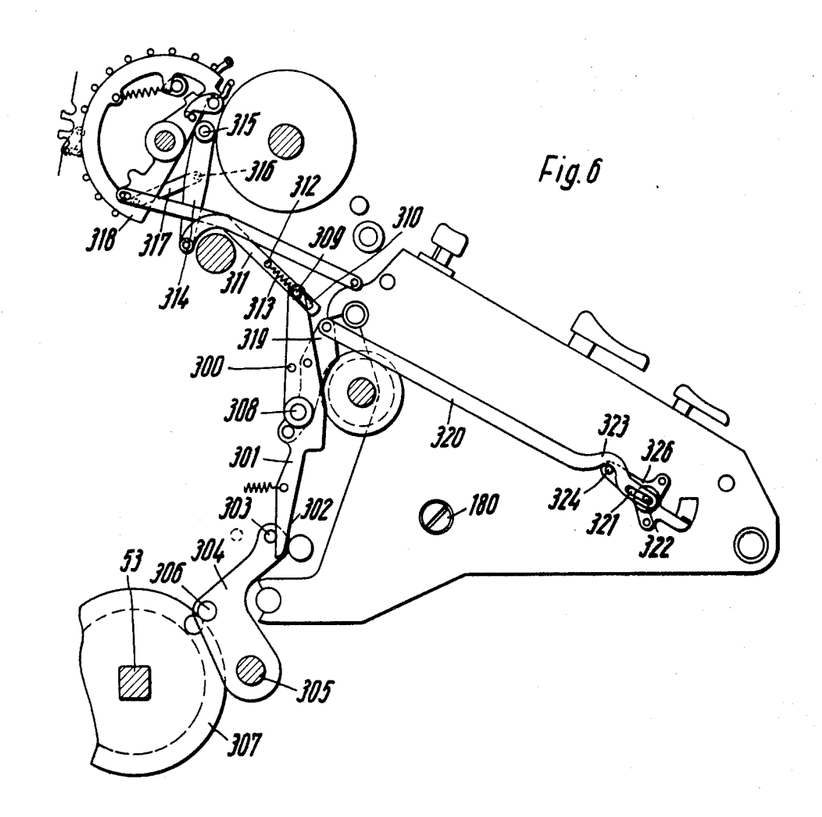
FIG. 6 is a side-elevational view of an automatic machine release mechanism according to the invention.

The hereinbefore described machine incorporating the device of the invention, operates as follows:

The differential control or release mechanism 180 (FIG. 3) of the control key row 12 sets or adjusts the control discs 201 (FIG. 5), when an operation of the machine is performed which has been triggered by the code key 16 (FIG. 2), into a position in which the scanning or sensing pin 203, which is biased by a strong tension spring 334, can drop into the recess 207 and, thereby, the bell-crank lever 215 moves in clockwise direction as viewed in FIG. 5, and the claw 230 thereof releases the switch lever 222 which, under the bias of the tension spring 335 associated therewith, is turned counterclockwise about the switch shaft 223, as viewed in FIG. 5, and the pins 224 and 225 release the feed pawl 226 as well as the locking pawl 228. With this operation of the machine, the balance amount mechanism 99 is switched into the final addition or summing operation of the machine and the result is expressed in a conventional manner. The starting control cam 268 releases, after the start of the preliminary operation of the machine, the scanning or sensing levers 248 to 253, which, however, cannot drop into recesses formed in the selector discs 242 to 247 during the first operation of the machine, because this operation is directly controlled by the code keys 16. During this machine operation, the cam disc 237 turns the feed disc 230 initially counterclockwise, the previously released feed pawl 226 thereof adjusting the ratchet wheel 241 and the selector discs 242 to 247 by one switching step in clockwise direction as viewed in FIG. 5, during the return movement occurring just before the end of the operation. In the course of the counterclockwise movement, the feed disc 230 draws the rod 295 downwardly, as viewed in FIG. 5, by means of the clip plate 291, whereby the locking lever 297 is swung away from the locking pin 300. The cam disc 307 (FIG. 6) turns the scanning or sensing lever 304 in counterclockwise direction, as viewed in FIG. 6, after the release of the locking pin 300, whereby the spring-loaded switch lever 301 turns in counterclockwise direction about the shaft 308, the switch rods 320 raise the zero stop pawls 326 of the row of control keys 13, as well as of the row 17 of calculator selecting keys, and the switch rod 311 adjusts the release segment 318 associated therewith, which releases the next operation of the machine which is carried out automatically.

As indicated hereinbefore, with each of the twelve positions of the differential release mechanism 180 associated with the control key row 12, there may be associated any desired selective control function which may be an addition or subtraction operation of the machine, an intermediate totaling operation. Associated with the individual positions of the non-illustrated differential release mechanism of the two rows 17 of calculator selecting keys are the selecting functions of the adding mechanisms 102 and 103 which are normally controlled manually for addition or subtraction by means of the calculator selecting keys 18/1 to 18/9 and 19/A to 19/I, respectively. The selector discs 242 to 247 shown in FIGS. 4 and 5, can assume or combine, during automatic operation, some of the selecting functions of the control keys 13 and 14, the code keys 16 and the calculator selecting keys 18 and 19, depending upon the requirements of the calculating program that is being carried out.

During the second operation of the machine which, as aforedescribed is triggered automatically, one of the scanning or sensing levers 250 or 251 drops into a recess formed in the selector disc 244 or 245, respectively associated therewith, so that the stepped stop 276 or 277 driven by the differential release mechanism associated therewith, effects a stopping contact in the first position which corresponds to the calculating mechanism selecting key 18/1. In contrast to the amount introducing function of the calculator selecting key 18/2, the appropriate adding mechanism 102/2 is set to zero by the final totaling operation with this operation of the machine and the abstracted sum transferred to the balance amount mechanism 99. This operation is followed automatically by other machine totaling operations wherein the adding mechanism 102/2 to 102/9 are set to zero and the sums obtained are transferred to the balance amount mechanism 99. After the totaling process of the adding mechanism 102/9, an intermediate machine totaling operation is controlled, through suitable construction of the selector discs 242 to 247, wherein the intermediate sum (ST) is abstracted from the balancing mechanism 99 and printed. This operation is followed automatically by other totaling operations of the machine wherein the adding mechanisms 19/A to 19/I are emptied. The determined sums, which may be positive or negative, are transferred also by addition or subtraction to the balance amount mechanism 99 and, according to the number of zero places of the adding mechanism 19/I, a final totaling operation of the machine takes place wherein the balancing amount mechanism 99 is set to zero and the cross sum of the adding mechanisms 102 and 103, which may be either positive or negative, is determined and printed. The pattern or schedule of the respective automatic operations of the machine is determined by the construction of the selector discs 242 to 247 so that the sequence of the calculating mechanisms to be controlled and the respective modes of operation to be controlled, namely addition, intermediate total or final total, are varied as desired and are thereby readily adjustable to any requirements.

Figure 7:
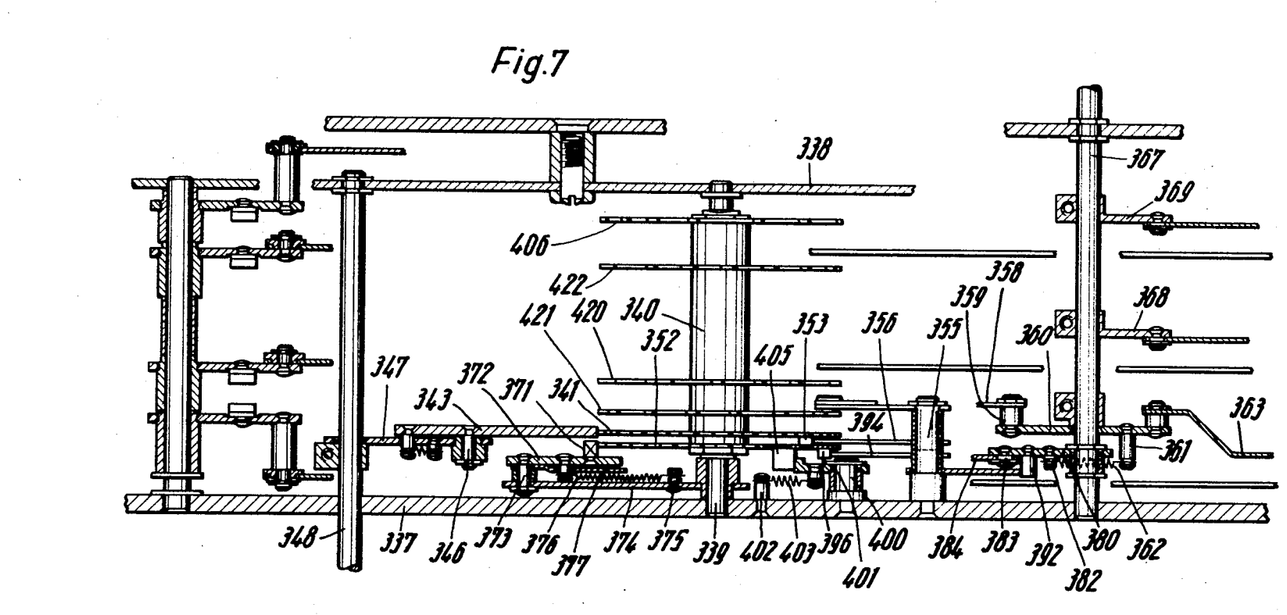
FIG. 7 is a plan view, partly in section, of the automatic control and selecting device of another type of machine.

In another embodiment which is described hereinafter in greater detail with reference to a type of machine disclosed in German Published Application DDS 1,424,611, the key board shown in FIG. 2 is used. Extending from and secured to the walls 337 and 338 (FIG. 7) of the machine is a spindle 339 which serves as a bearing for a hollow switch shaft 340 (FIG. 8) on which a switch disc 341 is seated having a serration of saw teeth 342. Cooperating with the switch disc 341 is a switch pawl 343, having a switch claw 344 which is inoperative in the starting position because of a stop 345 of the teeth 342. The switch pawl 343 is journalled on a pin 346 of a triangular switch lever 347 which is rigidly secured to a switch shaft 348 that, with each operation of the machine, is timely turned back one tooth division counterclockwise, as shown in FIG. 8, and subsequently again to the starting position by a non-illustrated switch cam driven by the main machine shaft and thereby effects the feed. The switch disc 341, the switch pawl 343 and the switch lever 347 form a stepping mechanism. A tension spring 351 suspended from the pins 349 and 350 of the switch pawl 343 and the switch lever 347, respectively, imparts a force-locking engagement of the switch claw 344 in the saw teeth 342. Inserted in a locking disc 352, shown in FIG. 7, is a switch pin 353 which cooperates with an inclined stop 354 (FIG. 8) of a double-armed switch lever 356 mounted on a pin 355, a clip plate or strap 358 being linked to the lever arm 357 of the switch lever 356 and overlaps a pin 359 of a triangular shift lever 360. A tension spring 362 engages a pin 361 of the shift lever 360, and a rod 363 is rotatably secured to the shift lever 360, the rod 363 being formed with an elongated slot 364, in which there is received a pin 365 that is secured to the zero stop pawl 366 of one of the rows 17 of calculator connecting keys (FIG. 2). The shift lever 360 is rigidly secured to a switch shaft 367 on which other levers 368 and 369 (FIG. 7) are located that displace, by means of rods associated therewith, the zero stop pawls coordinated with the other row 17 of calculator selecting keys (FIG. 2) and the row 12 of control keys.

The aforementioned locking disc 352 (FIG. 9) is also provided with locking teeth 370, which cooperate with a square stop 371 of a switch pawl 372 that is rotatably mounted on a pin 373 of a lever 374 and is influenced or controlled by a tension spring 376 that is suspended from a pin 375 extending from the lever 374. The lever 374 is freely rotatably seated on the spindle 339, and a draw bar 377 is, moreover, secured to a pin 373 extending therefrom, the draw bar 377 being rotatably mounted on a pin 378 extending from a switch lever 380 which is rotatable about the switch shaft 367. Suspended from the switch lever 380 (FIG. 9) is the tension spring 362 which is anchored to a pin 382 extending from the switch lever 380. On another pin 383 extending from the switch lever 380, a draw bar 384 is journalled and is rotatably secured by a pin 389 on the bearing eye 385 of a key slide 388 which is displaceable in pin and slot guides 386, 387. The key slide 388 has an inclined control surface 290 on which, when the code key 16 is actuated, there acts a key bolt 391, which is associated with the key lock 15, and urges the key slide 388 to the right-hand side, as viewed in FIG. 9. The key slide 388 accordingly turns the double lever 380 in clockwise direction, as viewed in FIG. 9, which influences the lever 374 to turn in counterclockwise direction, the lever 374, by means of the switch pawl 372 and its stop 371, displacing the locking disc 352 by one switching step in counterclockwise direction, so that the switch disc 341, which is also seated on the switch shaft 340, is displaced in the same direction, whereby the switch claw 344 is able to drop into a tooth 342 of the switch disc 341, and further displaces it by one switching step during the course of operation of the machine.

Riveted to the double lever 380 (FIG. 9) is a pin 392 which cooperates with a locking hook 393 of a locking lever 394 mounted on the pin 355, the locking lever 394 having an inclined stop 395 that is also influenced by a switch pin 396 secured to the locking disc 352. A tension spring 398 anchored on the pin 397 of the locking lever 394 and suspended from the fixed pin 399 pulls the locking lever 394 into the path of the switch pin 396, whereby the locking hook 393 thereof arrests the double lever 380 by means of the pin 392 and, consequently, the key slide 388 connected thereto.

Riveted to the machine wall 337 (FIG. 7) is a stay bolt 400 on which a locking pawl 401 (FIG. 9) is journalled which is biased by a tension spring 403 that is suspended from the pin 402. The locking pawl 401 has a stop 404 which cooperates with a locking bolt 405 which is riveted to the locking disc 352 and has a fixed starting position.

Mounted rigidly on the switch shaft 340 (FIG. 10) is a control disc 406, the circumferential profile 407 of which is provided with stepped stops 408/"0" to 408/"11" which cooperate with a rectangular scanning or sensing member 409 of a scanning or sensing pin 410 that is riveted to a scanning or sensing lever 412 which is rotatably mounted on a frame-fixed bearing pin 411, the lever 412 having a pin 413 which is engaged by a draw bar 414 that is articulatingly connected by a pin 415 to a release or control mechanism slide 416 of the control key row 12 (FIG. 2). The pin 415 also carries a draw bar 417 that is secured to a release or control mechanism lever 418 of a differential release or control mechanism 419 which is associated with the row 12 of control keys. When the differential mechanism 419 starts up, the scanning or sensing member 409 strikes against one of the stops 408 which determines the particular position of the release slide 416. One of the modes of operation, "addition," "intermediate or subtotal" or "final total" can be associated with each position of the release slide 416 or the differential release or control mechanism 419 in the positions "0" to "11." Moreover, with both types of machine, the control of the mode of operation is constructed in a conventional manner so that for one and the same machine operation, parallel with one of the operations "intermediate or sub-total" or "final total," the operation "addition" can be simultaneously controlled for one or more selectable calculating mechanisms in order, for example, to control an adding mechanism in the total sum operation of the machine and to deliver the final total extracted therefrom to a totaling mechanism which controls the "addition" operation. For the two rows 17 (FIG. 2) of calculator selecting keys, control discs 420 and 421 (FIG. 7) are secured to the switch shaft 340, and are in operative engagement in the same manner with the associated differential switch mechanism.

Figure 11:
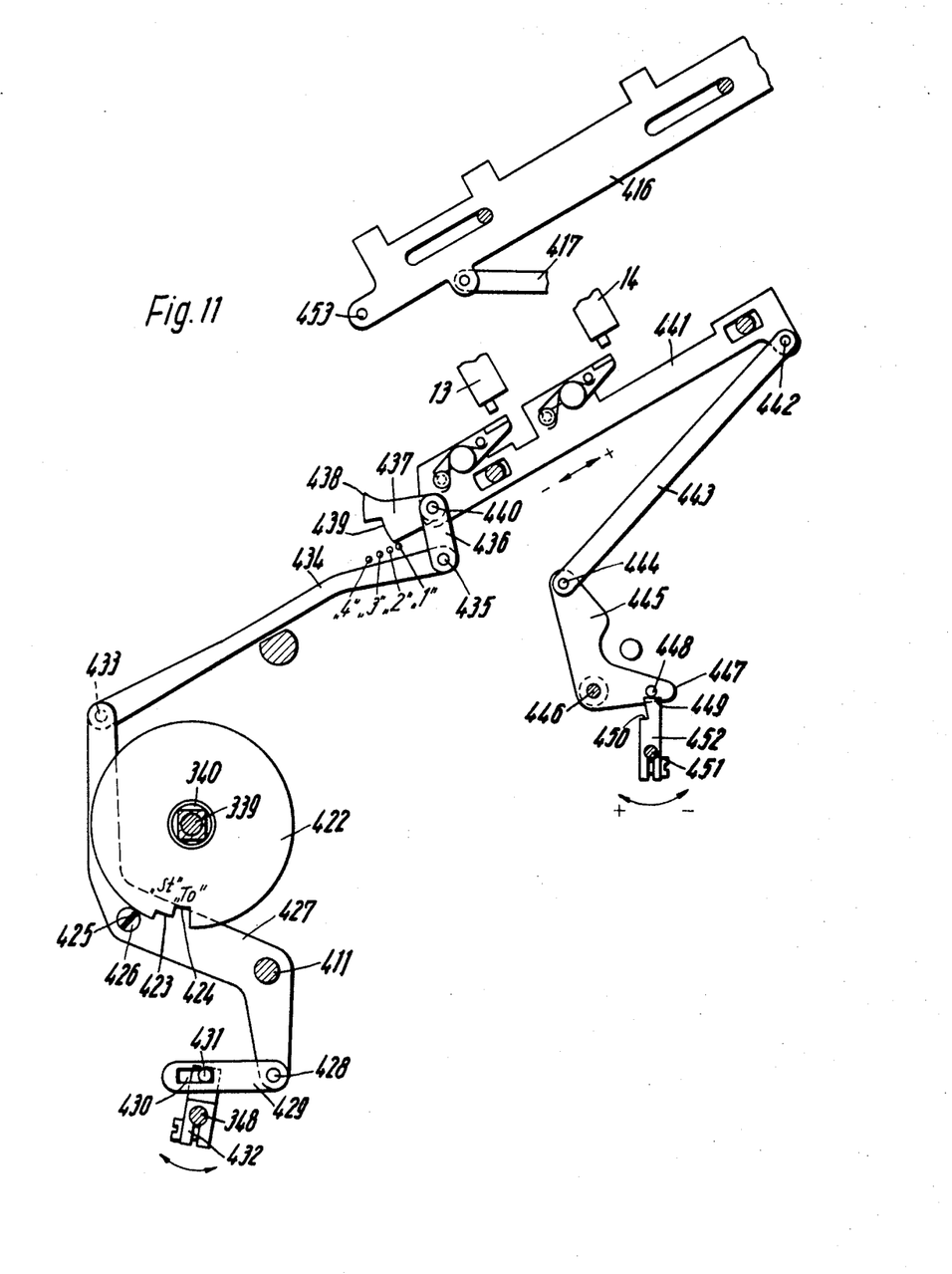
FIG. 11 is a side elevational view of the plus and minus control mechanism of the control and selecting device of FIG. 7.

For the automatic control of negative and positive intermediate or subtotal and final totals, there is secured to the switch shaft 340 another control disc 422 (FIG. 11), having stepped profiles 423 and 424 which cooperate with a rectangular scanning or sensing member 425 of a scanning or sensing pin 426 which is secured to a scanning or sensing lever 427 rotatably mounted on the pin 411. The pin 428 of the scanning lever 427 is provided with a rotatable link 429, formed with an elongated slot 430 in which a pin 431 of a switch lever 432, that is disposed on the control shaft 348, engages the lever 432, as indicated hereinbefore, executing a partial rotation with subsequent return for each operation of the machine, in order to bring the scanning or sensing lever 427 to the scanning or sensing position and to withdraw it therefrom before the operation of the machine is concluded. Another pin 433 is riveted to the scanning or sensing lever 427, a draw bar 434 being in engagement with the pin 433 and being articulatingly connected by a pin 435 to the lever arm 436 of a locking lever 437. The locking lever 437 is provided with two stops 438 and 439, and is journalled on a pin 440 of a control slide 441, which is provided with another pin 442 from which a rod 443 is suspended and is rotatable on a pin 444 extending from a bell-crank lever 445. The bell-crank lever 445 is journalled on a fixed pin 446 and is provided with a pin 448 that is riveted to a lever arm 447 thereof and cooperates with stops 449 and 450 of a locking lever 452 that is clamped to a switch shaft 451. The locking lever 452 is controlled by the balance amount mechanism through the switch shaft 451, the balance amount mechanism, according to the algebraic order or condition thereof, placing the stop 449 or 450 into the path of the pin 448.

The stops 438 and 439 cooperate with a pin 453 of the aforementioned release mechanism slide 416, the stops 438 and 439 being capable of determining, for example, the individual positions "1" to "4" of the release mechanism slide 416 during automatic positive or negative final or intermediate totaling operations of the machine. The stops 423 and 424 of the control disc 422, and the stops 449 and 450 adjustable by the balance amount mechanism provide, in cooperation with the stops 438 and 439, the positions "1" to "4" of the release mechanism slide 416 shown in FIG. 11.

Figure 8:
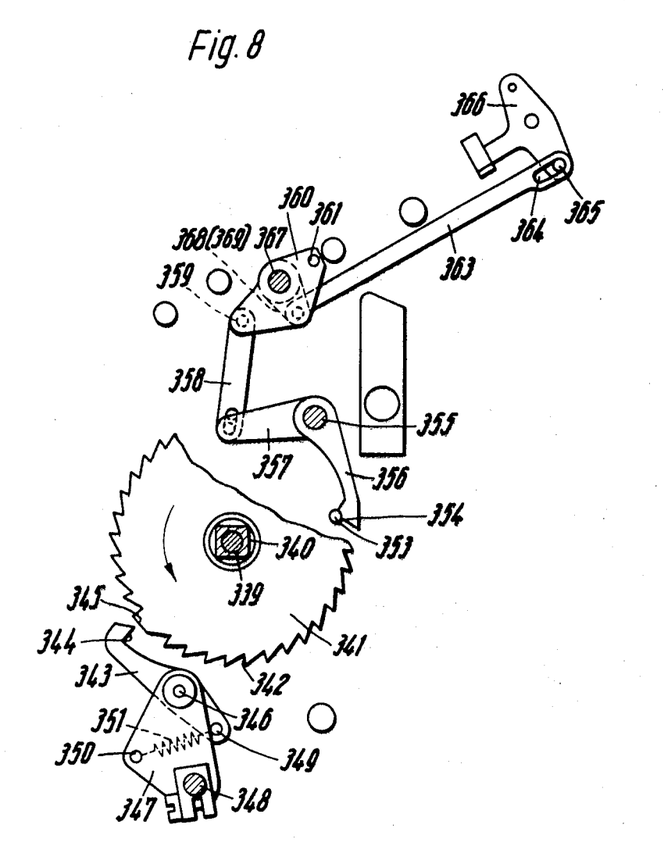
FIG. 8 is a side elevational view of a driving mechanism for the control and selecting device of FIG. 7.
Figure 9:
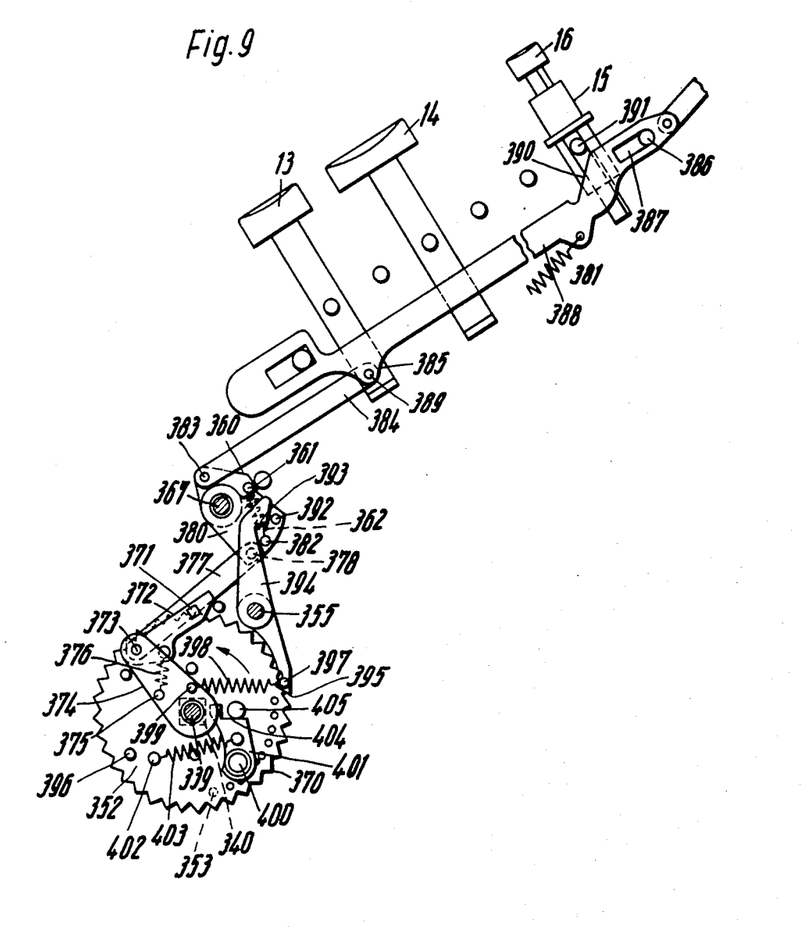
FIG. 9 is a plan view of a locking device for the control and selecting device of FIG. 7.

The switch shaft 340 tends to be driven in clockwise direction by a non-illustrated torsion spring which maintains the entire system in the starting position shown in FIGS. 8 and 9, or returns it when the last operation of the machine is completed.

Figure 10:
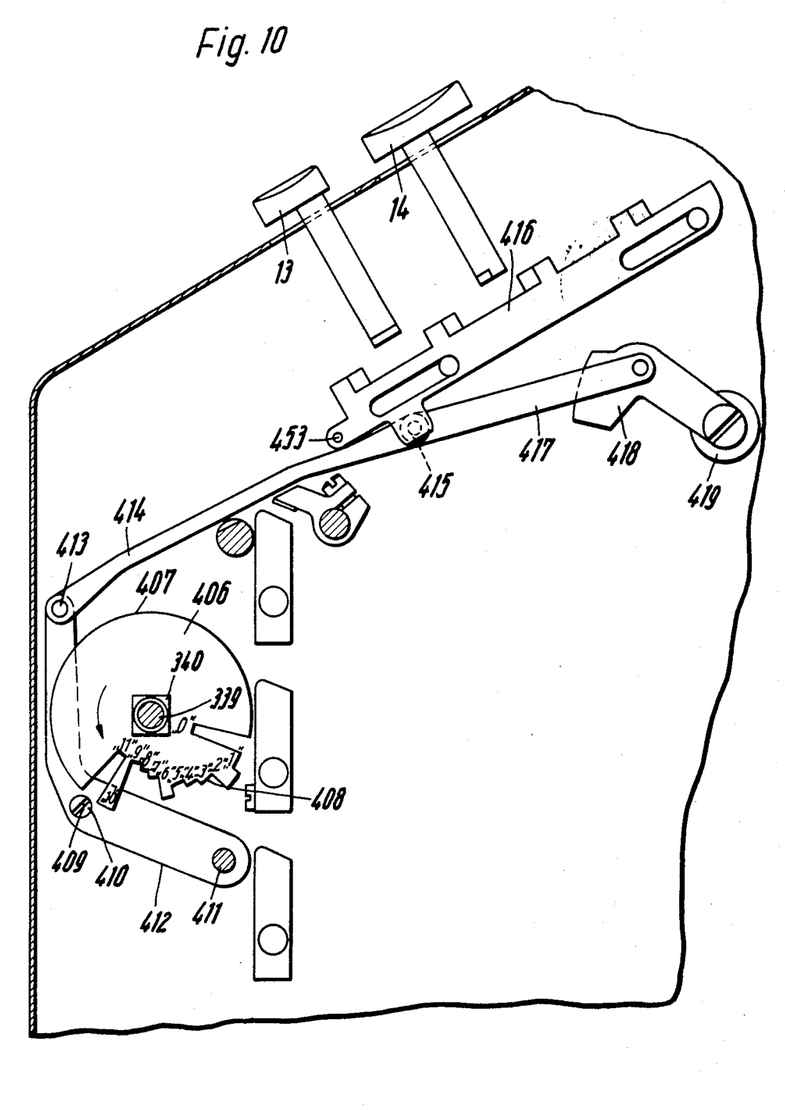
FIG. 10 is a side elevational view, partly in section, of the automatic control means of the controlling and selecting device of FIG. 7.

As may be seen from FIG. 10, up to twelve positions may be approached with the release mechanism slide 416, of which each position can be associated with a particular mode of operation and/or a particular selecting process. Through the combination of the control discs 406 and 420 to 422, any desired calculating mechanism may accordingly be selected and controlled in any mode of operation in a freely selectable sequence. In FIG. 10, the control disc 406 which is secured to the switch shaft 340 is shown in the final or end position thereof (position "11"), for greater clarity. In the starting position, the stepped stop 408/"0" is located opposite the scanning or sensing member 409. As is apparent, the individual positions of the control disc 406 are determined by the height or depth of the stepped stops 408/"0" to 408/"11," and are not identical with the positions "0" to "11" which the release slide mechanism 416 can initiate. For the control discs 420 and 421, the same conditions apply.

When the code key 16 (FIG. 2) is actuated, the locking mechanism is released by the key slide 388 which is associated with the row 12 of control keys, and a machine operation associated with the code key 16 is triggered, followed by other operations of the machine which proceed automatically under the influence of the control discs 406 and 420 to 422. The positions of the release or control mechanism slides or differential release or control mechanisms associated with the calculator selecting key rows 17 as well as the control key bank 12 determine the selecting operations that are to be carried out and the selection of the mode of operation.

Upon the conclusion of the operation of the machine triggered by the code key 16, the latter is again released and returns to the starting position thereof. The key slide 388, which is biased by a tension spring 381, on the other hand, is held by the locking lever 394 in the preferred operative position and retains this position until the switch pin 396 strikes against the locking lever 394 and displaces it in counterclockwise direction so that the locking lever 393 releases the pin 392 which is secured to the double lever 380, and the key slide 388 which is spring-biased can return to the starting position and lock the machine again.

In order to be able to stop the machine in a predetermined position of the automatic totaling operation, for example, in order to bring an old balance into the calculating operation that is in process, the locking disc 352 is provided with the switch pin 353 which displaces the guide lever 360 (FIG. 8) counterclockwise as it runs against the switch lever 356, and the key slide 388, which is returned to the starting position, thereby locks the machine again. Through the manual release or triggering of the machine operation "old balance," for example, by another code key 16, the automatically controlled calculating process is continued.

We claim:

1. Device for selecting calculating mechanisms and controlling modes of operation of a cash register or printing accounting machine having manual and automatic selecting and controlling means associated one with the other for selecting the calculating mechanisms and the respective modes of operation of the machine and including a row of control keys, rows of calculator selecting keys and differential release mechanisms associated with the rows of keys, comprising control discs which, in automatically operative condition of the machine, for determining cross totals of the calculating mechanisms, are pre-adjustable stepwise by the machine drive into a new control position for a next succeeding machine operation, stop means for said control discs, and sensing means for determining in said next succeeding machine operation a setting for one of the rows of control keys and for the differential release mechanisms associated with the rows of calculator selecting keys, upon which setting the selecting of the calculating mechanisms and the controlling of the modes of operation are dependent.

2. Device according to claim 1 including a control shaft wherein said control discs are mounted, a stepping mechanism actuable by the machine drive for effecting stepwise rotation of said control shaft, control means for switching on said stepping mechanism and transferring said control discs, before completion of an initiated machine operation, into a control position determining the functions of the next succeeding machine operation.

3. Device according to claim 1 wherein the differential release mechanism associated with the row of control keys and the differential release mechanisms associated with the rows of calculator selecting keys, respectively, have a multiplicity of positions to be controlled, said positions being selectable by said control discs in any alternate combination for controlling different operations of the machine.

4. Device according to claim 1 including a balance amount mechanism exerting a controlling influence upon automatic totaling operations of the machine for determining cross totals of the calculating mechanisms, said balance amount mechanism controlling, in accordance with the algebraic condition thereof, positive and negative intermediate and final totaling operations of the machine.

5. Device according to claim 2 wherein the control discs associated with the row of control keys and the rows of calculator selecting keys are secured in pairs on said control shaft, said sensing means comprising a plurality of sensing members respectively associated with said rows of keys, said differential release mechanisms each having a pair of stops, said sensing members being disposed, respectively, in the path of one of the stops of said pairs thereof, the particular position thereof determining the position of the differential release mechanism at the start of the operation of the machine.

6. Device according to claim 1 including means for determining, during subsequent machine operations, the cross total of selected calculating mechanism groups and printing the same by intermediate totaling processes, in order to determine the cross total of all the calculating mechanisms.

7. Device according to claim 1 including zero stop pawls operatively associated with the control key row and the calculator selecting key rows, and automatic control means, actuable during subsequent machine operations, for withdrawing said zero stop pawls.

8. Device according to claim 1 including means for interrupting automatic operation of the machine to determine the cross total of all of the calculating mechanisms, and means for manually triggering a further amount inserting machine operation to resume operation of the machine.

9. Device according to claim 2 including a locking disc operatively associated with said stepping mechanism, a switch pin insertable in a selected switch position, secured to said locking disc and serving to interrupt an initiated calculating operation of the machine, and key slide means cooperating with said pin for locking the machine.

10. Device according to claim 9 wherein said key slide is associated with a row of control keys, and including another switch pin located on said locking disc, and a locking lever cooperating with said other switch pin for arresting and releasing said key slide.

11. Device according to claim 9 wherein said key slide is associated with a row of control keys, and including a ratchet drive for effecting adjustment of said locking disc and said stepping mechanism associated therewith, and a force-lockingly guided switch lever connecting said key slide to said ratchet drive.

12. Device according to claim 9 including zero stop pawls operatively associated with the control key row and the calculator selecting key rows, and wherein said switch pin secured to said locking disc controls said zero stop pawls.

* * * * *